United States Patent
Shaw et al.

[11] Patent Number: 6,065,576
[45] Date of Patent: May 23, 2000

[54] STRUT FOR PLANAR ONE-WAY CLUTCH

[75] Inventors: David W. Shaw, Saginaw; Gary B. Scott, Midland, both of Mich.

[73] Assignee: Means Industries, Inc., Saginaw, Mich.

[21] Appl. No.: 09/045,322

[22] Filed: Mar. 20, 1998

[51] Int. Cl.[7] .......................... F16D 41/12; B21D 22/00
[52] U.S. Cl. .................. 192/46; 72/356; 192/45.1
[58] Field of Search ................ 192/46, 45.1, 69.1, 192/107 M, 108; 29/557, 558; 72/379.2, 404, 356

[56] References Cited

U.S. PATENT DOCUMENTS

| | | |
|---|---|---|
| 3,791,188 | 2/1974 | Deussen . |
| 3,844,155 | 10/1974 | Bew et al. . |
| 5,070,978 | 12/1991 | Pires .......................................... 192/46 |
| 5,449,057 | 9/1995 | Frank . |
| 5,476,165 | 12/1995 | Awaji et al. .......................... 192/45.1 |
| 5,597,057 | 1/1997 | Ruth et al. . |
| 5,632,179 | 5/1997 | Numata et al. . |
| 5,640,874 | 6/1997 | Vecsey . |
| 5,855,263 | 1/1999 | Fergle ....................................... 192/46 |

*Primary Examiner*—Rodney H. Bonck
*Assistant Examiner*—Tisha D. Waddell
*Attorney, Agent, or Firm*—Brooks & Kushman P.C.

[57] ABSTRACT

A strut for mechanically coupling a driving member to a driven member in a planar one-way clutch is formed in a progressive die from a length of cold-formed metallic stock material such that the strut's diametrical member-engaging end surfaces are coextensive with a pair of cold-formed surfaces of the stock material. A pair of oppositely-projecting "ears" are integrally formed on the strut proximate to one of its end surfaces at one station of the progressive die. The ears cooperate with a complementary recess or pocket formed in one member's planar clutch face to thereby nominally position and maintain the strut's first end surface within the pocket. A surface on each ear is preferably coined at another station of the progressive die to thereby provide a relief which prevents deleterious contact between the ears and the opposed clutch face of the other clutch member.

16 Claims, 3 Drawing Sheets

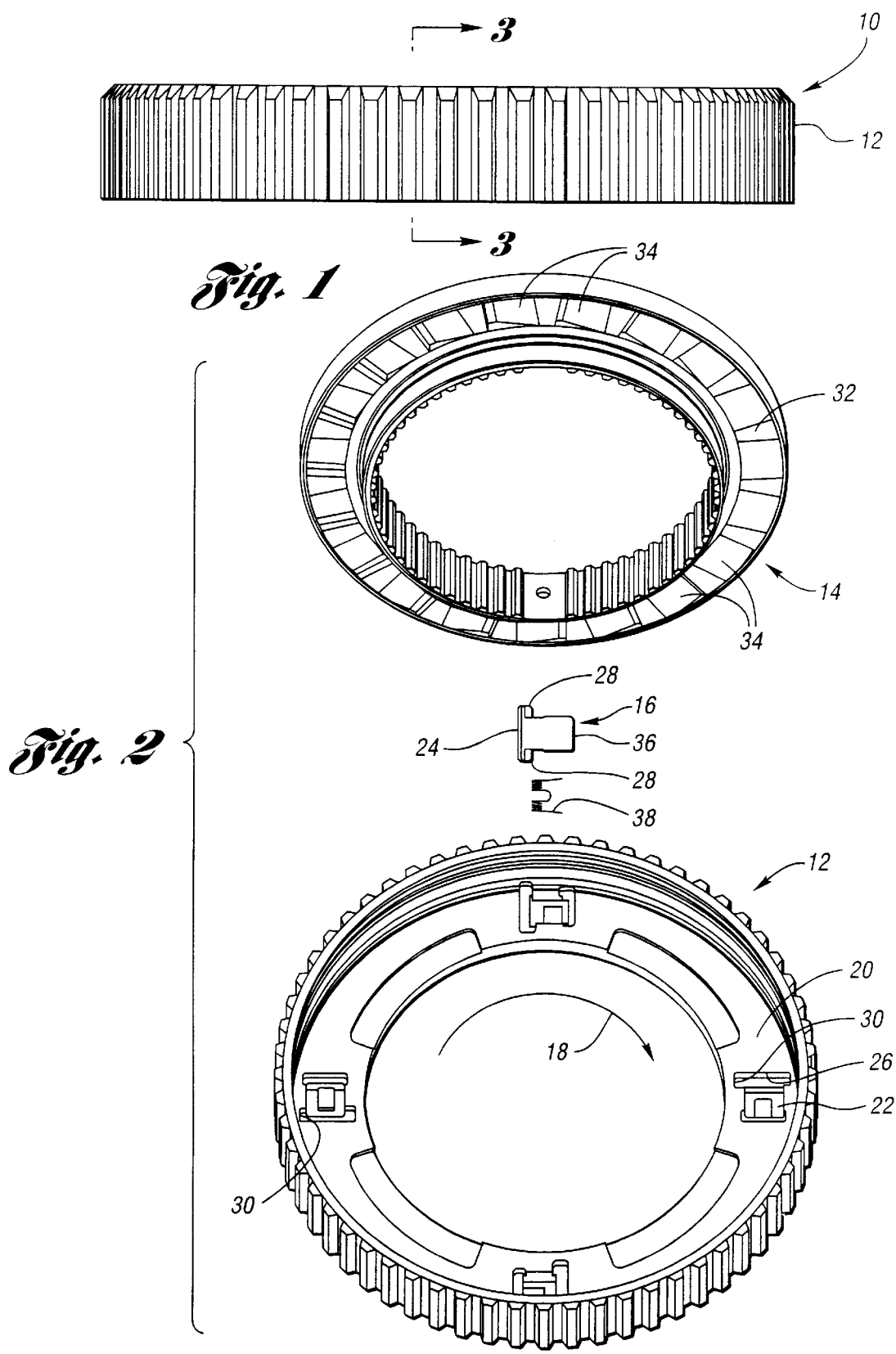

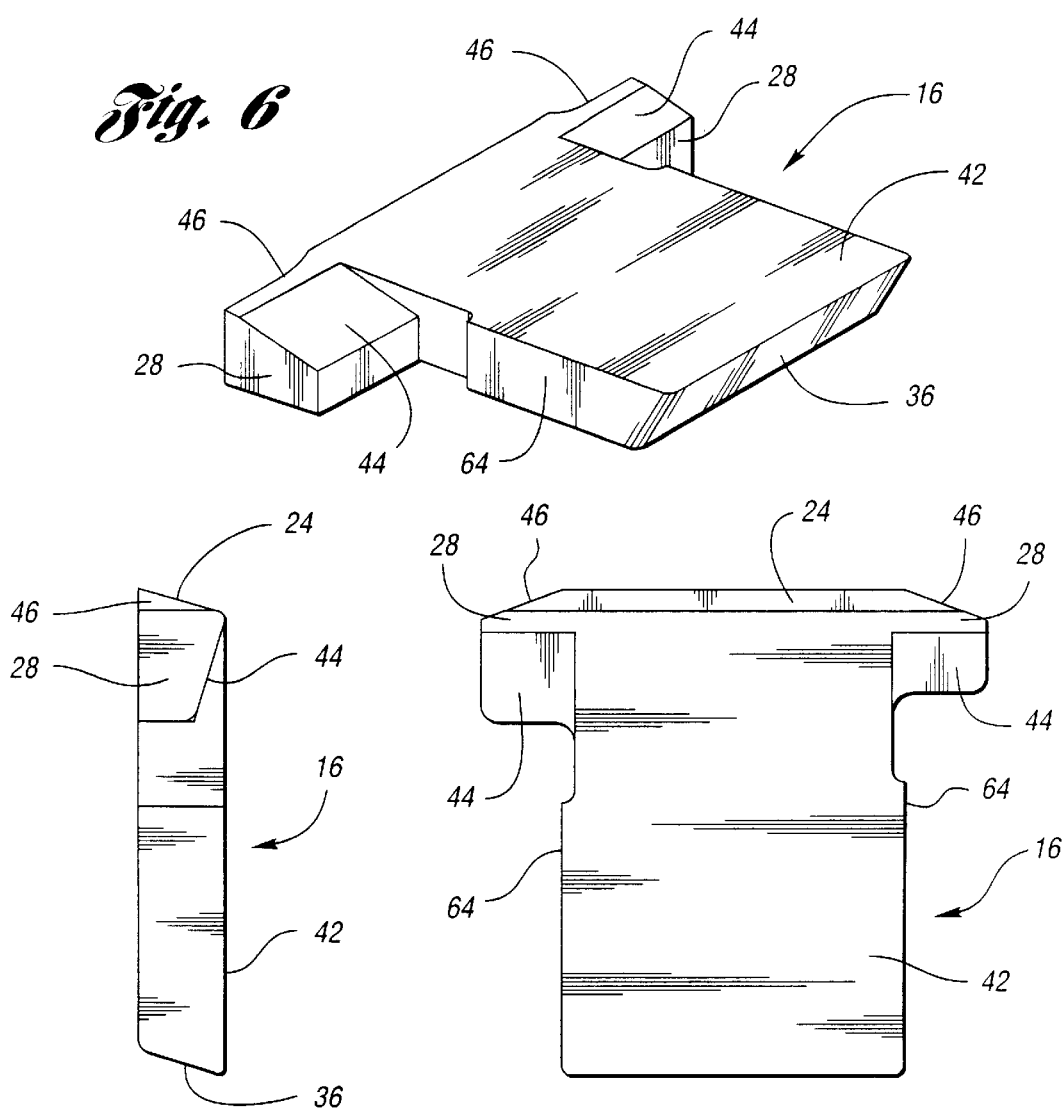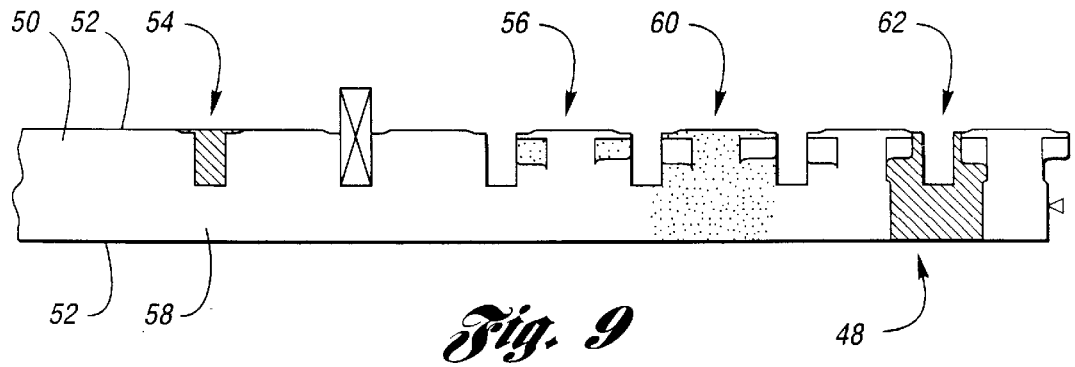

STRUT FOR PLANAR ONE-WAY CLUTCH

TECHNICAL FIELD

The invention relates to "one-way" clutches and, more particularly, to planar one-way clutches wherein a relatively thin, flat strut selectively provides a mechanical couple between the opposed, generally planar faces of a pair of coaxial rotatable members.

BACKGROUND ART

Clutches are used in a wide variety of applications to selectively couple power from a first rotatable "driving" member, such as a driving disk or plate, to a second, independently-rotatable "driven" member, such as a driven plate or disk. In one known variety of clutches, commonly referred to as "one-way" or "overrunning" clutches, the clutch "engages" to mechanically couple the driving member to the driven member only when the driving member seeks to rotate in a first direction relative to the driven member. Once so engaged, the clutch will release or decouple the driven member from the driving member only when the driving member rotates in a second, opposite direction relative to the driven member. Further, the clutch otherwise permits the driving member to freely rotate in the second direction relative to the driven member. Such "free-wheeling" of the driving member in the second direction relative to the driven member is also known as the "over-running" condition.

One such known one-way clutch employs juxtaposed, nominally-coaxial driving and driven members featuring generally planar clutch faces in closely-spaced axial opposition. Such "planar" one-way clutches, as taught by Frank in U.S. Pat. No. 5,449,057 and Ruth et al. in U.S. Pat. No. 5,597,057, typically include a plurality of recesses or "pockets" formed in the face of the driving member and at least as many recesses or "notches" formed in the face of the driven member. A thin, flat pawl or strut, whose width is significantly less than its length, is carried within each of the driving member's pockets such that a first longitudinal end of each strut may readily engage and bear against a radial shoulder defined by its respective pocket in the driving member. The strut's second, opposite longitudinal end is urged towards and against the face of the driven member, for example, by a spring positioned in the pocket beneath the strut.

When the driving member rotates in the first direction relative to the driven member, the second end of at least one strut engages and thereafter bears against a radial shoulder defined by a notch in the driven member, whereupon the strut is placed in compression and the driven member is coupled for rotation with the driving member. When the driving member rotates in the second direction relative to the driven member, a ramped surface defined by other portions of the driven member's notches urge the second end of each strut back towards the driving member, whereupon the driving member is permitted to freely rotate in the second direction relative to the driven member.

In order to improve the quality of the strut-member engagement, the member-engaging ends of each strut are each provided with a canted surface, each nominally parallel with the other. And, in U.S. Pat. No. 5,597,057, Ruth et al. further teach use of a strut whose first end includes a pair of oppositely-projecting "arms" or "ears," the top surface of which is ramped to prevent interference between the top of each ear and the driven member as the second end of the strut is biased towards the driven member. By way of example, where the radial shoulders defined in each of the driving and driven members extend in a direction substantially normal to each member's generally planar clutch face, the ramped top surface of each ear is inclined roughly the same angle as each of the strut's canted end surfaces. A portion of each ear adjacent to the canted surface of the strut's first end is also preferably removed to form a relief which ensures that the strut's ears will not be loaded during clutch engagement.

While struts with parallel, canted end surfaces and ramped ears provide these prior art planar one-way clutches with increased performance, the presence of these features significantly increases the manufacturing costs associated with these thin, flat struts. For example, in accordance with one known process, the struts used in these planar one-way clutches are fine blanked in laterally-adjacent pairs from relatively-thin coil stock in a five-step process: (1) the coil stock is coined to provide the appropriate ramp angle on that which will become the strut's ears; (2) the stock is "U"-trimmed to define the outer periphery of the ears; (3) the stock is further trimmed to define the sides of the strut; (4) the edges of the web are formed down as by bending the web over a horn to thereby provide an inverted "V," each leg of which descends at the nominal angle with which the strut's member-engaging end surfaces are to be formed; and (5) the lateral pair of struts are blanked out of the descending legs of the web, one from each leg, as the punch pierces through the web on an angle. As a further disadvantage, this prior art process is performed at a relatively slow rate of perhaps about 18 to 20 strokes per minute.

The canted end surfaces of these blanked prior art struts typically feature about 10 percent breakout and substantial roll over. The resulting end surface distortions reduce the amount of available member-engaging end surface contact area on each strut, even after the costly subsequent machining of the end surfaces. Perhaps more significantly, the difficulty of controlling both the down angle of the web as it is bent over the horn and the subsequent angle at which the punch shears each of the strut's end surfaces combines with the end surface distortions to result in reduced dimensional control, including relatively poor control of the angle at which each of the strut's end surfaces is canted, and an attendant loss of parallelism between the strut's end surfaces.

DISCLOSURE OF INVENTION

It is an object of the invention to provide an improved thin, flat strut for a planar one-way clutch featuring improved member-engaging end surfaces.

It is another object of the invention to provide an improved thin, flat strut for a planar one-way clutch featuring improved parallelism between the strut's member-engaging end surfaces.

It is also an object of the invention to provide a method for making a strut for a planar one-way clutch featuring improved dimensional control of the strut and, particularly, of the strut's canted end surfaces.

It is yet another object of the invention to provide a method for making a strut for a planar one-way clutch featuring reduced cost and complexity when compared with known methods.

It is yet another object of the invention to provide a method for making a strut for a planar one-way clutch which may be operated at a higher run rate than known methods.

Under the invention, a thin, flat strut for a planar one-way clutch is formed from a length of cold-formed metallic stock material such that the strut's diametrical member-engaging end surfaces are coextensive with a pair of lateral edge surfaces of the stock material. Preferably, at least one lateral edge surface of the stock material includes a substantially planar section which is canted relative to the upper face of the stock material. Most preferably, both lateral edge surfaces of the stock material forming the strut's diametrical, member-engaging surfaces include canted, substantially planar sections, and these substantially planar sections are substantially parallel to one another.

In accordance with a feature of the invention, the strut preferably includes a pair of oppositely-projecting ears integrally formed on either side of the strut proximate to a first one of the strut's member-engaging surfaces. The ears cooperate with a complementary recess or pocket formed, for example, in the driving member's generally planar clutch face to thereby nominally position and maintain the strut's first member-engaging surface within the pocket. Preferably, a ramped surface is formed on each ear to obviate any possible interference between the ears and the opposed clutch face of the driven member when the strut otherwise pivots to present its second end surface for engagement with the driven member's notches. A second surface of each ear, which is nominally an extension of the first member-engaging surface of the strut, is also preferably trimmed to form a relief on each ear. The reliefs ensure that the ears do not bear coupling loads when the strut couples the driving member to the driven member.

Under the invention, a method of making a thin, flat strut includes providing a length of thin, cold-formed stock material having a pair of lateral edge surfaces, wherein at least one lateral edge surface of the stock material includes a substantially planar section; and forming the strut from the stock material such that the diametrical end surfaces of the strut are coextensive with a the lateral edge surfaces of the stock material. More specifically, in an exemplary method of practicing the invention, the strut is formed by advancing stock material through a plurality of die stations, as of a progressive die.

By way of example, in the exemplary method for making struts, the stock material is advanced through a first trimming station for removing material from a lateral edge surface of the stock material at a first location thereof, thereby providing the edge relief on each of what will later become the strut's integral ears, removing material to prevent deleterious flow of material during a subsequent coining step, and defining a pilot hole in the stock material to facilitate registration of the stock material relative to later die stations.

The trimmed stock material is thereafter advanced to a second coining station for coining a surface of the stock material adjacent to the first location thereof, whereby the ramped surfaces of what will ultimately be each ear of one strut are formed. In a third flattening station, the stock is flattened to remove any upward creep induced in the stock material by coining. In a fourth cutoff station, additional material is removed from the stock material proximate to the first location thereof, whereby the strut is severed from the stock material. As a further feature of the method of the invention, the thus-severed sides of each strut have substantially more breakout than the sides of struts produced by prior art fine-blanking processes.

While an exemplary strut and an exemplary method for making the same are illustrated and disclosed, such disclosure should not be construed to limit the claims. It is anticipated that various modifications and alternative designs may be made without departing from the scope of the invention.

BRIEF DESCRIPTION OF DRAWINGS

FIG. 1 is a side elevational view of an exemplary planar one-way clutch, incorporating struts in accordance with the invention;

FIG. 2 is an exploded view of the clutch of FIG. 1;

FIG. 6 is a perspective view of an exemplary strut in accordance with the invention;

FIG. 7 is a side view of the exemplary strut shown in FIG. 6;

FIG. 8 is a top plan view of the exemplary strut shown in FIG. 6; and

FIG. 9 is a strip layout showing the operations performed at each station within a progressive die, with hatch shading identifying trimming or blanking operations and stippling showing coining or flattening operations.

BEST MODE FOR CARRYING OUT THE INVENTION

Figure 3:
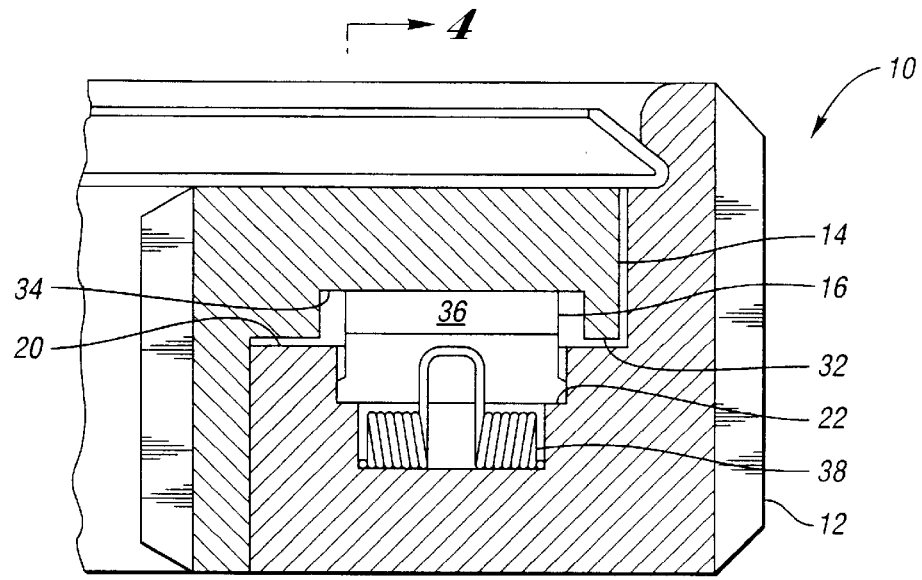
FIG. 3 is a sectional view of the exemplary clutch along line 3—3 of FIG. 1 illustrating a strut in its "engaged" or "coupled" condition.
Figure 4:
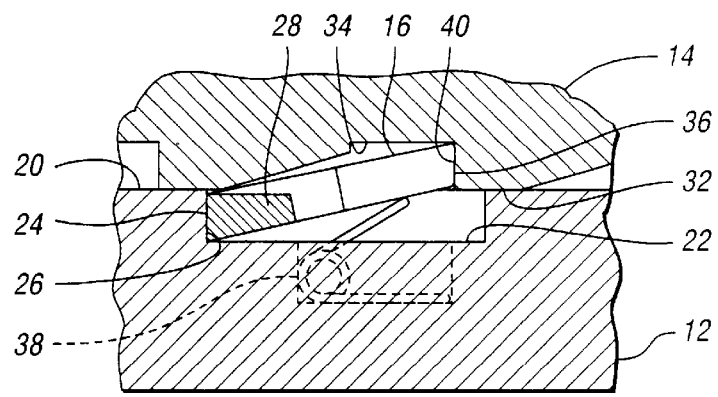
FIG. 4 is a sectional view of the exemplary clutch along line 4—4 of FIG. 3.
Figure 5:
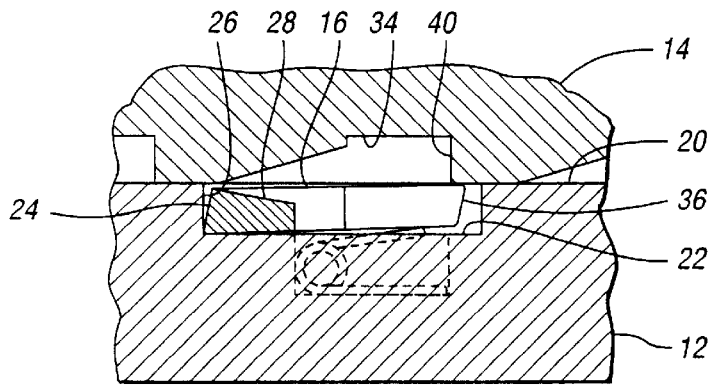
FIG. 5 is a sectional view of the exemplary clutch similar to that own in FIG. 4, but illustrating the strut in the "free-wheeling" or "overrunning" condition.

Referring to the drawings, FIGS. 1–5 show an exemplary planar one-way clutch 10 which includes a driving member 12, a driven member 14 and a plurality of struts 16 which operate to mechanically couple the driving member 12 to the driven member 14 only when the driving member 12 rotates in a first direction 18 relative to the driven member 14.

More specifically, the driving member 12 includes a generally planar clutch face 20 having a plurality of recesses or pockets 22 defined therein. Each pocket 22 is adapted to receive and nominally retain a given strut 16 such that a first end surface 24 on the strut 16 is placed in opposition with, and will thereafter operatively engage, a radial shoulder 26 defined in the pocket 22 when the driving member 12 is rotated in the first direction 18.

While the invention contemplates use of any suitable arrangement whereby each strut's first end surface 24 is nominally positioned within the strut's respective pocket 22, in the illustrated exemplary clutch 10, each strut 16 includes a pair of oppositely-projecting ears 28 which extend laterally from the strut 16 proximate to its first end 24. Each strut's the ears 28 cooperatively engage the pocket's complementary radially-inner and radially-outer surfaces 30 to thereby nominally position the first end 24 of the strut in its respective pocket 22.

The driven member 14 similarly includes a generally planar clutch face 32 which is placed in closely-spaced axial opposition to the face 20 of the driving member 12. The driven member's clutch face 32 likewise has a plurality of recesses or notches 34 defined therein. Each of the notches 34 in the driven member 14 is adapted to receive the free end of a given strut 16 when the strut's free end is urged into the notch 34, for example, by a spring 38 seated beneath the strut 16 in the driving member's pocket 22. Each notch 34 includes a bearing surface 40 with which to operatively engage a second end surface 36 on the strut 16 when the driving member 12 is rotated in the first direction 18 relative to the driven member 14.

As seen more clearly in the enlarged views of the strut 16 shown in FIGS. 6–8, the strut's first and second member-engaging end surfaces 24,36 each include substantially planar sections which are canted relative to the upper face 42 of the strut 16, as illustrated in FIGS. 6–8. The substantially planar sections of the strut's first and second end surfaces 24,36 are themselves substantially parallel to one another. In the exemplary clutch illustrated in the Drawings, the first and second end surfaces 24,36 are canted to a nominal angle of about 16 degrees relative to the strut's upper face 42.

In accordance with another feature of the invention, a ramped surface 44 is formed on each ear 28 to obviate any possible interference between the ears 28 and the opposed clutch face 32 of the driven member 14 when the strut 16 otherwise pivots upward to present its second end surface 36 for engagement with the driven member's clutch face 32. A second surface 46 of each ear 28 is also preferably trimmed to form a relief on each ear 28. The reliefs formed by the ear's second surfaces 46 ensure that the ears 28 do not bear coupling loads when the strut 16 couples the driving member 12 to the driven member 14.

An exemplary method of making the strut of the invention is illustrated diagrammatically by the strip layout 48 shown in FIG. 9, wherein hatching identifies trimming or blanking operations and stippling identifies coining or flattening operations. The exemplary method includes providing a length of thin, cold-formed stock material 50, such as a cold-drawn or cold-rolled wire of spheroidized and annealed SAE 1065 steel, having its lateral surfaces 52 canted to a predetermined angle; and forming the strut 16 from the stock material 50 such that the diametrical end surfaces 24,36 of the strut 16 are coextensive with the lateral edge surfaces 52 of the stock material 50.

More specifically, the exemplary method of FIG. 9 includes advancing the stock material 50 to a first die station (indicated generally at 54), and trimming the stock material 50 at the first die station 54 to define a pilot hole, to define the second surface 46 on what will later be defined as the strut's oppositely-projecting ears 28, to prepare the stock material 50 for a subsequent coining operation, and to otherwise reduce the amount of web between adjacent struts 16.

The exemplary method of FIG. 9 continues by advancing the trimmed stock material 50 to a second station (indicated generally at 56), and coining the upper surface of the stock material 50 at the second station 56 to thereby define the ramped surface 44 on each ear 28 of the strut 16 being formed immediately downstream of the trimmed location 58 on the stock material 50. In this regard, it is noted that the relief provided by the trimming operation performed at the first station 54 preferably prevents unwanted projections or burrs that might otherwise result from deleterious material flow during coining.

The coined stock material 50 is thereafter advanced to a third die station (indicated generally at 60) in which the stock material 50 is flattened to thereby reduce any curvature which might have been induced in the stock material 50 during coining. Lastly, the flattened stock material 50 is advanced to a fourth cutoff station (indicated generally at 62) wherein additional web material proximate to advanced trimmed location 58 is removed, and the finished strut is severed from the strip. In this regard, it is noted that an intended mismatch between the first trimming step and the cutoff step, which provides the stepped side surfaces 64 of each strut as seen in FIGS. 6–8, may be used to further prevent the deleterious formation of burrs on the strut 16 during cutoff.

As noted above, in the exemplary method, a single progressive die (not shown) may be used to combine each of the recited four die stations 54,58,60,62, with each recited advancing step being performed on the stock material 50 simultaneously, with registration of the strip relative to the die being ensured through use of the pilot holes formed at the first die station. As a result, in accordance with another feature of the invention, the exemplary method produces one strut 16 per stroke of the progressive die, at a substantially higher run rate than that employed in the prior art fine-blanking process for making such struts. By way of example, it is presently estimated that a progressive die operating in accordance with the strip layout 48 illustrated in FIG. 9 is capable of at least about 70 strokes per minute.

It will be appreciated that the strut 16 produced in accordance with the exemplary method of FIG. 9 may undergo further processing in a manner known to those of ordinary skill. Thus, in the exemplary method wherein the stock is spheroidized and annealed SAE 1065 steel, each ejected strut is thereafter tumbled to achieve a suitable edge/corner break, such as a maximum of 0.015 inches; hardened at 1550° F.; oil quenched; and tempered at 350° F. to a minimum hardness of 53 Rockwell-C.

In accordance with a feature of the invention, the exemplary method of FIG. 9 features significantly tighter dimensional control over the strut's canted end surfaces 24,36, including the degree of parallelism between the canted end surfaces 24,36 and the member-engaging face contact area defined on each canted end surface 24,36, because these end surfaces 24,36 are themselves defined by the dimensions of the raw stock material 50. Moreover, the "as-drawn" or "as-cold-formed" end surfaces 24,36 of each strut 16 made in accordance with the invention feature a substantially continuous grain structure in which individual grains are extend in substantially parallel relation. In this manner, the exemplary method of FIG. 9 provides both improved strut quality and improved functionality when compared to struts produced by prior art fine-blanking processes.

In accordance with yet another feature of the invention, the exemplary method generates less scrap than prior art fine-blanking processes because a substantial portion of the periphery of each strut 16 is defined by the raw stock material rather than as a function of the fine-blanking process.

While an exemplary strut and method of making the same have been illustrated and described, it is not intended that the exemplary strut and method illustrate and describe all possible forms of the invention. Rather, it is intended that the following claims cover all modifications and alternative designs, and all equivalents, that fall within the spirit and scope of this invention.

What is claimed is:

1. A thin, flat strut for a planar one-way clutch comprising a first end surface and a second end surface diametrically opposite the first end surface, wherein the strut is formed from a length of cold-formed metallic stock material having a pair of cold-formed lateral edge surfaces such that the first and second end surfaces of the strut are coextensive with the lateral edge surfaces of the stock material, and wherein at least one lateral edge surface of the stock material includes a substantially planar section.

2. The strut of claim 1, wherein the stock material includes an upper face, and wherein the substantially planar section of the at least one lateral edge surface of the stock material is canted relative to a the upper face of the stock material.

3. The strut of claim 1, wherein the lateral edge surfaces of the stock material each include a substantially planar section, and wherein the substantially planar sections of the lateral edge surfaces of the stock material are in substantially parallel relation.

4. The strut of claim 1, including a pair of oppositely-projecting integrally formed ears proximate to the first end surface of the strut.

5. A method of making a thin, flat strut for a planar one-way clutch, wherein the strut includes a pair of diametrical end surfaces, the method comprising:

providing a length of thin, cold-formed stock material having a pair of cold-formed lateral edge surfaces, wherein at least one lateral edge surface of the stock material includes a substantially planar section;

forming the strut from the stock material such that the diametrical end surfaces of the strut are coextensive with the lateral edge surfaces of the stock material.

6. The method of claim 5, wherein forming includes advancing the stock material through a plurality of die stations.

7. The method of claim 6, wherein a first one of the plurality of die stations includes a trimming station for removing material from each lateral edge surface of the stock material at a first location.

8. The method of claim 7, wherein a second one of the plurality of die stations includes a coining station after the trimming station for coining a surface of the stock material proximate to the first location thereof.

9. The method of claim 8, wherein a third one of the plurality of die stations includes a flattening station after the coining station for flattening the stock material.

10. The method of claim 9, wherein a fourth one of the plurality of die stations includes a cutoff station for removing additional material from the stock material proximate to the first location thereof, whereby the strut is severed from the stock material.

11. A method of making a thin, flat strut for a planar one-way clutch, wherein the strut includes a pair of canted end surfaces in substantially parallel relation, the method comprising:

providing a length of thin, cold-formed stock material having a pair of cold-formed lateral edge surfaces, wherein the lateral edge surfaces of the stock material include substantially planar sections in substantially parallel relation with one another; and forming the strut from the stock material such that the diametrical end surfaces of the strut are coextensive with the lateral edge surfaces of the stock material.

12. The method of claim 11, wherein forming includes advancing the stock material through a plurality of die stations.

13. The method of claim 12, wherein a first one of the plurality of die stations includes a trimming station for removing material from each lateral edge surface of the stock material at a first location.

14. The method of claim 13, wherein a second one of the plurality of die stations includes a coining station after the trimming station for coining a surface of the stock material proximate to the first location thereof.

15. The method of claim 14, wherein a third one of the plurality of die stations includes a flattening station after the coining station for flattening the stock material.

16. The method of claim 15, wherein a fourth one of the plurality of die stations includes a cutoff station for removing additional material from the stock material proximate to the first location thereof, whereby the strut is severed from the stock material.

* * * * *